(12) United States Patent
Ishibashi et al.

(10) Patent No.: US 11,035,493 B2
(45) Date of Patent: Jun. 15, 2021

(54) CONTROLLER

(71) Applicant: FUJIKIN INCORPORATED, Osaka (JP)

(72) Inventors: Keisuke Ishibashi, Osaka (JP); Michio Yamaji, Osaka (JP); Tadayuki Yakushijin, Osaka (JP); Shunji Obara, Osaka (JP); Keigo Kobayashi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/497,469

(22) PCT Filed: Mar. 27, 2018

(86) PCT No.: PCT/JP2018/012275
§ 371 (c)(1),
(2) Date: Sep. 25, 2019

(87) PCT Pub. No.: WO2018/181234
PCT Pub. Date: Oct. 4, 2018

(65) Prior Publication Data
US 2020/0018331 A1    Jan. 16, 2020

(30) Foreign Application Priority Data
Mar. 31, 2017   (JP) .............................. JP2017-072072

(51) Int. Cl.
*F16K 31/122*       (2006.01)
*F16K 7/16*         (2006.01)
(Continued)

(52) U.S. Cl.
CPC .............. *F16K 31/122* (2013.01); *F16K 7/16* (2013.01); *F16K 7/18* (2013.01); *F16K 31/44* (2013.01);
(Continued)

(58) Field of Classification Search
CPC .......... F16K 31/122; F16K 7/16; F16K 31/44; F16K 3/34; F16K 7/18
See application file for complete search history.

(56) References Cited

U.S. PATENT DOCUMENTS 4,270,398 A * 6/1981 Arnold .................. F16H 25/183
                                                    74/110
4,549,719 A * 10/1985 Baumann .............. F16H 25/183
                                                    100/291
(Continued)

FOREIGN PATENT DOCUMENTS

| CN | 205745581 U | 11/2016 |
|---|---|---|
| JP | 07-310842 A | 11/1995 |

(Continued)

OTHER PUBLICATIONS

International Search Report dated Jun. 26, 2018, issued for PCT/JP2018/012275.
(Continued)

*Primary Examiner* — Umashankar Venkatesan
(74) *Attorney, Agent, or Firm* — Locke Lord LLP

(57) ABSTRACT

Provided is a small-sized controller capable of precisely controlling a flow rate of a high-pressure fluid. Between a working shaft of a drive device and a valve stem, a power transmission device is disposed to amplify a force acting on the working shaft and transmit the resultant force to the valve stem. A diaphragm as a valve element is made of metal and is deformable to: a state where a fluid passage is fully closed; a state where the fluid passage is fully open; or a state where the fluid passage is partially open. When the fluid passage is partially open, on the basis of the flow rate of a fluid flowing through fluid passages, the drive device finely adjusts the position of the working shaft such that the flow rate is constant.

4 Claims, 4 Drawing Sheets

(51) Int. Cl.
*F16K 7/18* (2006.01)
*F16K 31/44* (2006.01)
F15B 15/10 (2006.01)
F15B 15/14 (2006.01)
F16K 3/34 (2006.01)

(52) U.S. Cl.
CPC ........... *F15B 15/10* (2013.01); *F15B 15/1447* (2013.01); *F16K 3/34* (2013.01)

(56) References Cited

U.S. PATENT DOCUMENTS

| | | | | |
|---|---|---|---|---|
| 4,684,103 | A * | 8/1987 | Baumann | F16K 31/1262 251/280 |
| 4,741,510 | A * | 5/1988 | Baumann | F16K 7/16 251/120 |
| 4,875,404 | A * | 10/1989 | Aldridge | F16K 31/163 92/130 A |
| 5,112,027 | A * | 5/1992 | Hanyu | F16K 7/16 251/274 |
| 5,215,286 | A * | 6/1993 | Kolenc | F16K 7/12 251/214 |
| 5,516,075 | A * | 5/1996 | Itoi | F16K 31/163 251/58 |
| 5,556,072 | A * | 9/1996 | Itoi | F16K 7/16 251/58 |
| 6,059,259 | A * | 5/2000 | Gregoire | F16K 7/14 251/331 |
| 7,303,176 | B2 * | 12/2007 | Tokuda | F16K 31/163 251/58 |
| 8,662,469 | B2 * | 3/2014 | Ejiri | F16K 31/52408 251/58 |
| 9,377,110 | B2 * | 6/2016 | Anagnos | F16K 31/524 |
| 2009/0114873 | A1 * | 5/2009 | Anagnos | F16K 7/16 251/331 |
| 2017/0016544 | A1 * | 1/2017 | Chiba | F16K 31/1221 |

FOREIGN PATENT DOCUMENTS

| | | |
|---|---|---|
| JP | 2001-241565 A | 9/2001 |
| JP | 3338972 B2 | 10/2002 |
| JP | 2017-503123 A | 1/2017 |
| JP | 2017-44321 A | 3/2017 |

OTHER PUBLICATIONS

Office Action dated Oct. 10, 2020 and Search Report, issued in the corresponding CN patent application No. 01880023072.4 and an English translation of the Office Action.

* cited by examiner

CONTROLLER

TECHNICAL FIELD

The present invention relates to a controller capable of controlling a flow rate of a fluid, and more particularly to a controller suitable for using a high-pressure fluid.

BACKGROUND ART

In the field of semiconductor manufacturing, in order to prevent generation of particles, a diaphragm valve that opens and closes a flow passage by deforming a metal diaphragm is suitably used as a controller.

A diaphragm valve suitable for using a high-pressure fluid is disclosed by Patent Literature 1, which includes: a valve body in which a fluid passage is provided; a diaphragm configured to close and open the fluid passage by coming into contact with and separating from an annular valve seat provided to the valve body, respectively; a valve stem configured to change a position thereof, thereby deforming the diaphragm in closing and opening directions; a drive device configured to move the position of the valve stem; and a power transmission device disposed between a working shaft of the drive device and the valve stem, and configured to amplify a force acting on the working shaft and to transmit a resultant force thus amplified to the valve stem.

A controller disclosed by Patent Literature 1 is an on-off valve that provides either of open and closed states, and cannot control the flow rate of the fluid. As a diaphragm valve that controls the flow rate of the fluid, Patent Literature 2 discloses a controller that uses piezoelectric elements for an actuator, which enables control of the flow rate of the fluid. However, the actuator using the piezoelectric elements cannot obtain a thrust force required for closing and stopping the valve, and therefore is unsuitable for a valve in which a high-pressure fluid is used.

CITATION LIST

Patent Literature

Patent Literature 1: Japanese Patent No. 3338972
Patent Literature 2: Japanese Unexamined Patent Application Publication JP-A-H7-310842

SUMMARY OF INVENTION

Technical Problem

The controllers disclosed by Patent Literatures 1 and 2 are both unsuitable for use in controlling the flow rate of a high-pressure fluid, and there have hitherto been no controllers available which are capable of controlling the flow rate of the high-pressure fluid. In addition, conventional controllers configured to control the flow rate of the fluid are large-sized, and therefore there has been a demand for size reduction thereof.

An object of the present invention is to provide a small-sized controller capable of controlling the flow rate of a high-pressure fluid with higher precision.

Solution to Problem

The controller in accordance with the present invention is a controller including: a valve body in which a fluid passage is provided; a diaphragm configured to close and open the fluid passage by coming into contact with and separating from an annular valve seat provided to the valve body, respectively; a valve stem configured to change a position thereof, thereby deforming the diaphragm in closing and opening directions; and a drive device configured to move the position of the valve stem; wherein, between a working shaft of the drive device and the valve stem, a power transmission device configured to amplify a force acting on the working shaft and to transmit a resultant force thus amplified to the valve stem is provided, the diaphragm is made of metal and is deformable to either state among: a fully closed state in which the fluid passage is fully closed; a fully open state in which the fluid passage is fully open; and a partially open state in which the fluid passage is partially open, and, in the partially open state in which the fluid passage is partially open, on a basis of a flow rate of a fluid that flows through the fluid passage, the drive device makes an adjustment to a position of the working shaft such that the flow rate is constant.

The drive device is, for example, a pneumatic cylinder device, which is preferably controlled by an electropneumatic regulator that controls air pressure steplessly in proportion to an electric signal.

For example, the power transmission device includes: a casing; a first roller-receiving member that is cone-shaped and is integrally formed with the working shaft; a second roller-receiving member that is integrally formed with the valve stem; a pair of roller supports disposed between both of the first and second roller-receiving members; a pair of rolling rollers that are in contact with a tapered surface formed on the first roller-receiving member; and a pair of pressing rollers that are in contact with a roller receiving surface of the second roller-receiving member, in which each of the roller supports is configured to be supported on the casing so as to swing about a shaft that is deviated from an axis of the pressing roller toward an axis of the first roller-receiving member (an example of the power transmission device of an amplification type). By employing the amplification type, thrust force can be reduced whereby size reduction of the controller can be achieved.

This controller may be used for various purposes, and in particular, may be suitably used when a high-pressure fluid is used as the fluid and controlling a minute stroke is required.

Conventional controllers using power transmission devices of an amplification type have been used for performing opening/closing operations, and have not been capable of adjusting the opening degree of the diaphragms on the basis of the flow rate of fluids used. In the case where the flow rate of the high-pressure fluid is to be controlled, there arises a need to control the amount of valve stem movement minutely. Conventional controllers that use piezoelectric elements have not been capable of performing such a control. However, by using the power transmission device of an amplification type, it becomes possible not only to cause the valve stem to move against high pressure but also to control the amount of valve stem movement minutely because, even in the case of a small stroke, the resolution can be increased. In addition, by combining this power transmission device and the drive device that adjusts the position of the working shaft on the basis of the flow rate of the fluid flowing through the fluid passage, it becomes possible to control the flow rate of the high-pressure fluid with higher precision. This enables a high precision controller (flow rate adjustment valve for a high-pressure fluid) to be obtained, which has not been conventionally realized.

It is preferable that the drive device is a pneumatic cylinder device and comprises: a cylinder having a recess that is open at one end side of the cylinder; a bonnet configured to close an opening of the cylinder; a piston disposed in the recess of the cylinder; a rod fixed to a distal end side of the piston and configured to press the working shaft; and a diaphragm having a center portion fixed to the piston, a peripheral edge portion fixed between the cylinder and the bonnet, and a turn portion between the center portion and the peripheral edge portion both of which are fixed, in which compressed air supplied between the bonnet and the diaphragm is caused to press the piston via the diaphragm, thereby moving the rod.

By combining the power transmission device that is of an amplification type and the drive device that uses a diaphragm having a turn portion, it becomes possible to optimize the opening degree of the diaphragm configured to close and open the fluid passage to be in a range that is not greater than 0.6 mm.

It is preferable that the fluid passage has: a central passage that has an opening surrounded by the valve seat and that is opposed to a center portion of the diaphragm; and an outside passage that has an opening on a radially outside of the valve seat and that is opposed to a vicinity of an outer peripheral edge portion of the diaphragm, in which the outside passage constitutes an inlet passage of the fluid and the central passage constitutes an outlet passage of the fluid.

That is, conventionally, the central passage has been used as an inlet passage and the outside passage has been used as an outlet passage, whereas, for the present invention, the outside passage is used as an inlet passage and the central passage is used as an outlet passage whereby, even when a high-pressure fluid is used, the fluid passage is prevented from abruptly changing its state to be open.

It is preferable that the central passage has a diameter that is not greater than a diameter of the outside passage.

Conventionally, the central passage and the outside passage each have had a large diameter so as to increase the flow rate, and the diameter of the central passage has been substantially the same as the diameter of the outside passage. By contrast, decreasing the diameter of the central passage, which is an outlet passage, allows a Cv value to be 0.035, for example. Thus, it is possible to obtain a controller having a diaphragm stroke of 0.002 to 0.2 mm and a Cv value of 0.0005 to 0.035, which has not been conventionally realized.

Advantageous Effects of Invention

With the controller in accordance with the present invention, using the power transmission device of an amplification type not only enables the valve stem to move against high pressure but also enables the controlling of the amount of valve stem movement minutely. By combining this power transmission device and the drive device configured to adjust the position of the working shaft on the basis of the flow rate of the fluid flowing through the fluid passage, it is possible to control the flow rate of the high-pressure fluid with higher precision. In addition, the present invention enables size reduction of the controller.

REFERENCE SIGNS LIST

Figure 1:
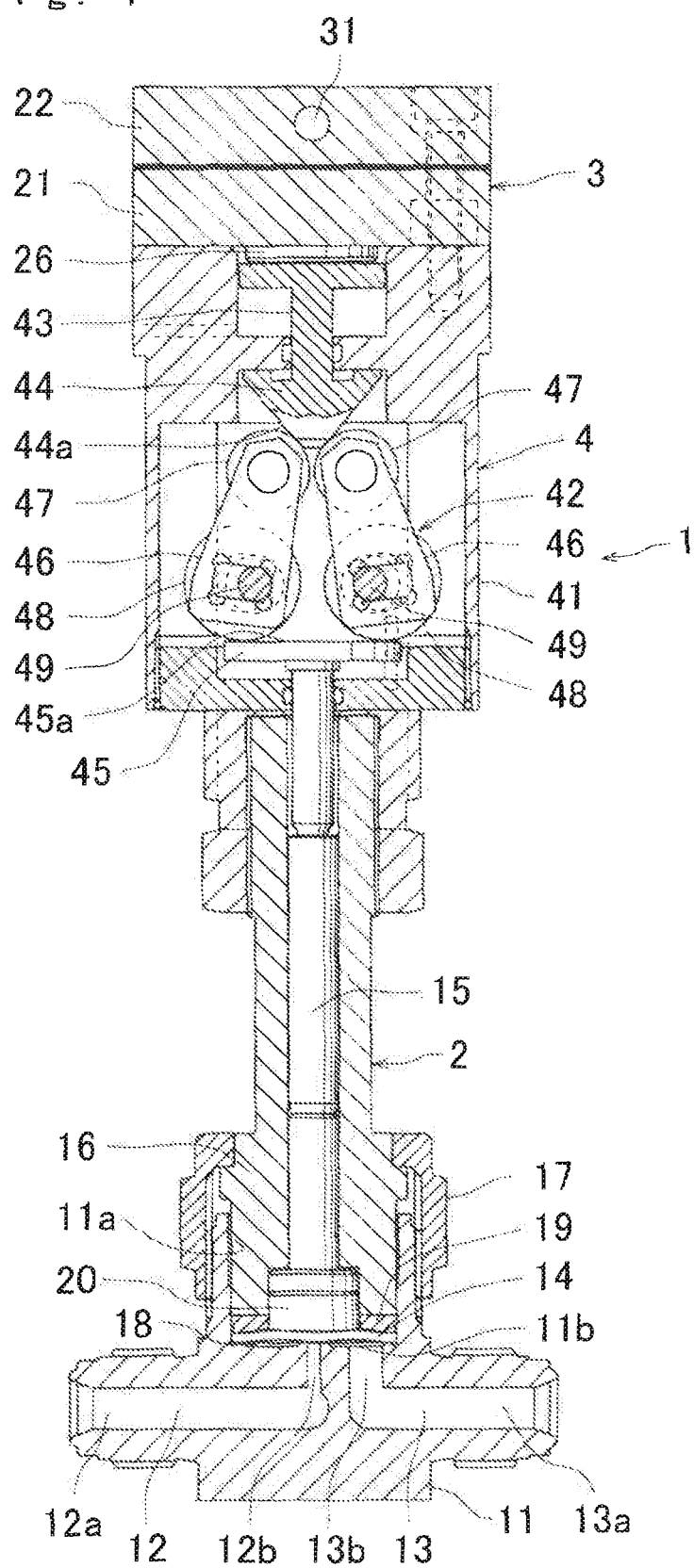
FIG. 1 is a longitudinal sectional view of a controller in accordance with one embodiment of the present invention, showing a state in which a fluid passage is open.

1: controller
2: valve main portion
3: drive device
4: power transmission device
11: valve body
12: first fluid passage
12b: central passage
13: second fluid passage
13b: outside passage
14: diaphragm
15: valve stem
21: cylinder
21a: recess
22: bonnet
23: piston
25: diaphragm
25a: turn portion
26: rod

DESCRIPTION OF EMBODIMENTS

In the following description, the upper and lower sides and the left and right sides of the accompanied drawings are referred to as upper and lower sides (the vertical direction) and left and right sides, respectively. The terms, upper and lower sides and left and right sides, are used herein for convenience's sake. In installing a controller, the controller may be placed upside down, or the controller may be placed with the upper and lower sides directed horizontally, in some cases.

Figure 2:
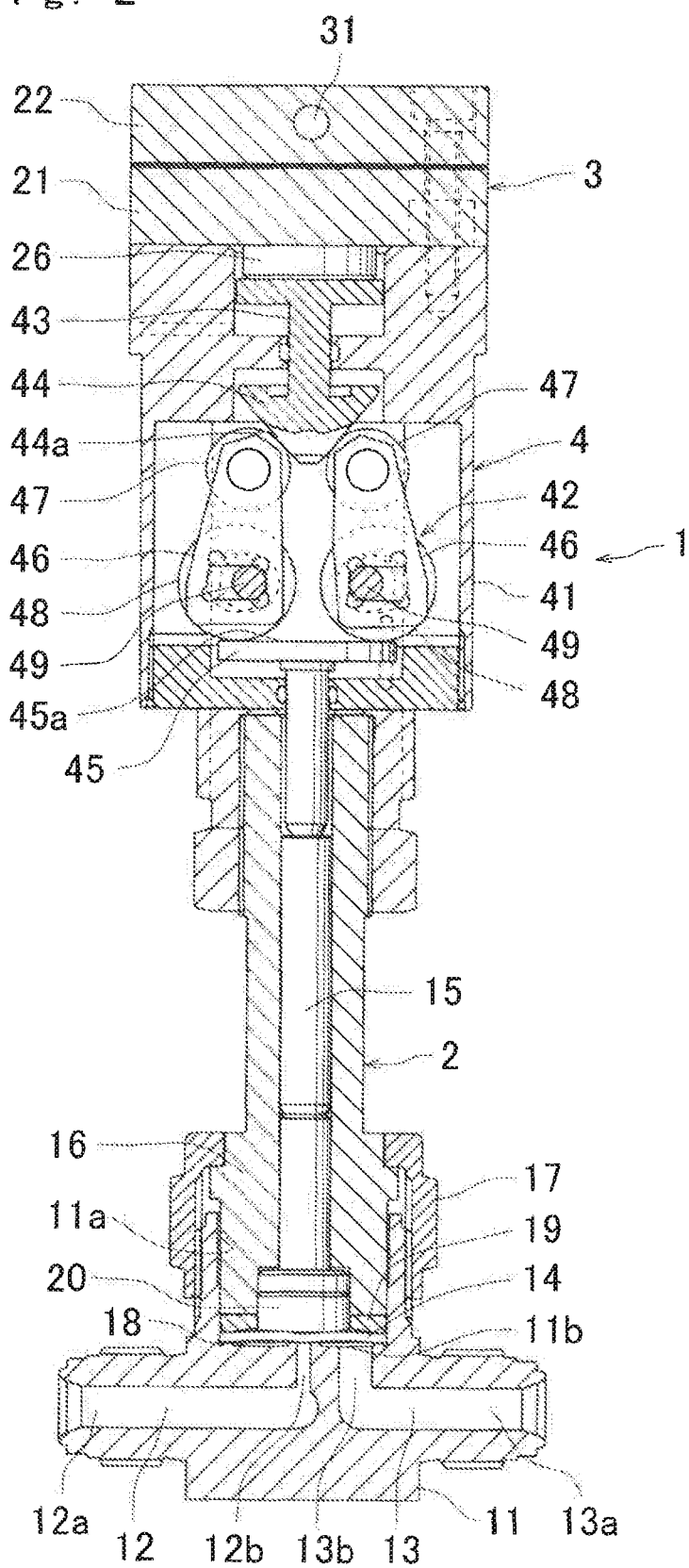
FIG. 2 shows a state in which the fluid passage is closed by a valve stem being moved from the state shown in FIG. 1.

FIG. 1 and FIG. 2 show the controller in accordance with the present invention. A controller 1 includes: a valve main portion 2; a drive device 3; and a power transmission device 4 disposed between the valve main portion 2 and the drive device 3.

The valve main portion 2 has: a valve body 11 in which first and second fluid passages 12, 13 are formed; a diaphragm 14 configured to open and close communication between the fluid passages 12, 13; a valve stem 15 configured to cause the diaphragm 14 to deform in an opening direction or a closing direction; and a bonnet 16 attached to the valve body 11 with a nut 17.

The valve body 11 is made of SUS316L stainless steel and has a recess 11a that is open upward. The first fluid passage 12 consists of: a large-diameter passage 12a that is open leftward; and a central passage 12b that is contiguous with a right end portion of the large-diameter passage 12a, has a diameter smaller than that of the large-diameter passage 12a, and is open toward a center portion of a bottom surface of the recess 11a. The second fluid passage 13 consists of: a large-diameter passage 13a that is open rightward; and an outside passage 13b that is contiguous with a left end portion of the large-diameter passage 13a, has a diameter smaller than that of the large-diameter passage 13a, and is open toward a right portion of the bottom surface of the recess 11a.

A fluid flows in from the large-diameter passage 13a of the second fluid passage 13 and flows out from the large-diameter passage 12a of the first fluid passage 12.

The valve body 11 is provided with an annular valve seat 18 so as to surround an opening of the central passage 12b of the first fluid passage 12. Because the valve seat 18 protrudes upward, the valve seat 18 in the valve body 11 has, on an outer periphery thereof, an annular passage 11b that is in communication with the outside passage 13b of the second fluid passage 13.

The diaphragm 14 is made of metal and has the shape of a spherical shell, with a circular arc portion thereof bulging upward in a natural state. The diaphragm 14 has a peripheral edge portion that is supported on a protruding outer peripheral edge portion of the bottom surface of the recess 11a of the valve body 11, which is pressed against a press adaptor 19 from above, whereby the diaphragm 14 is fixed to the valve body 11. The diaphragm 14 has a center portion that is pressed downward by a disc 20 fixed at a lower end portion of the valve stem 15. By adjusting the position of the disc 20 vertically, the diaphragm 14 is maintained at an open position with a predetermined opening degree. In the present embodiment, the controller 1 is of a normally-open type, and when the drive device 3 is caused to operate, the controller 1 is designed so that a closed state is obtained in which the center portion of the diaphragm 14 is pressed forcefully against the valve seat 18.

For example, the diaphragm 14 is made of a sheet alloy of nickel. The sheet alloy is cut out into a circular shape, so as to form the diaphragm 14 having the shape of a spherical shell, with the center portion thereof bulging upward. The diaphragm 14 may be made of a thin sheet of stainless steel or may be composed of a layered body including: a thin sheet of stainless steel; and a sheet alloy of nickel and cobalt, in some cases.

The valve body 11 may be heated with a heater in order to prevent freezing and the like, and the length of the valve stem 15 is set so as not to exert an influence of the heating on the drive device 3.

Figure 5:
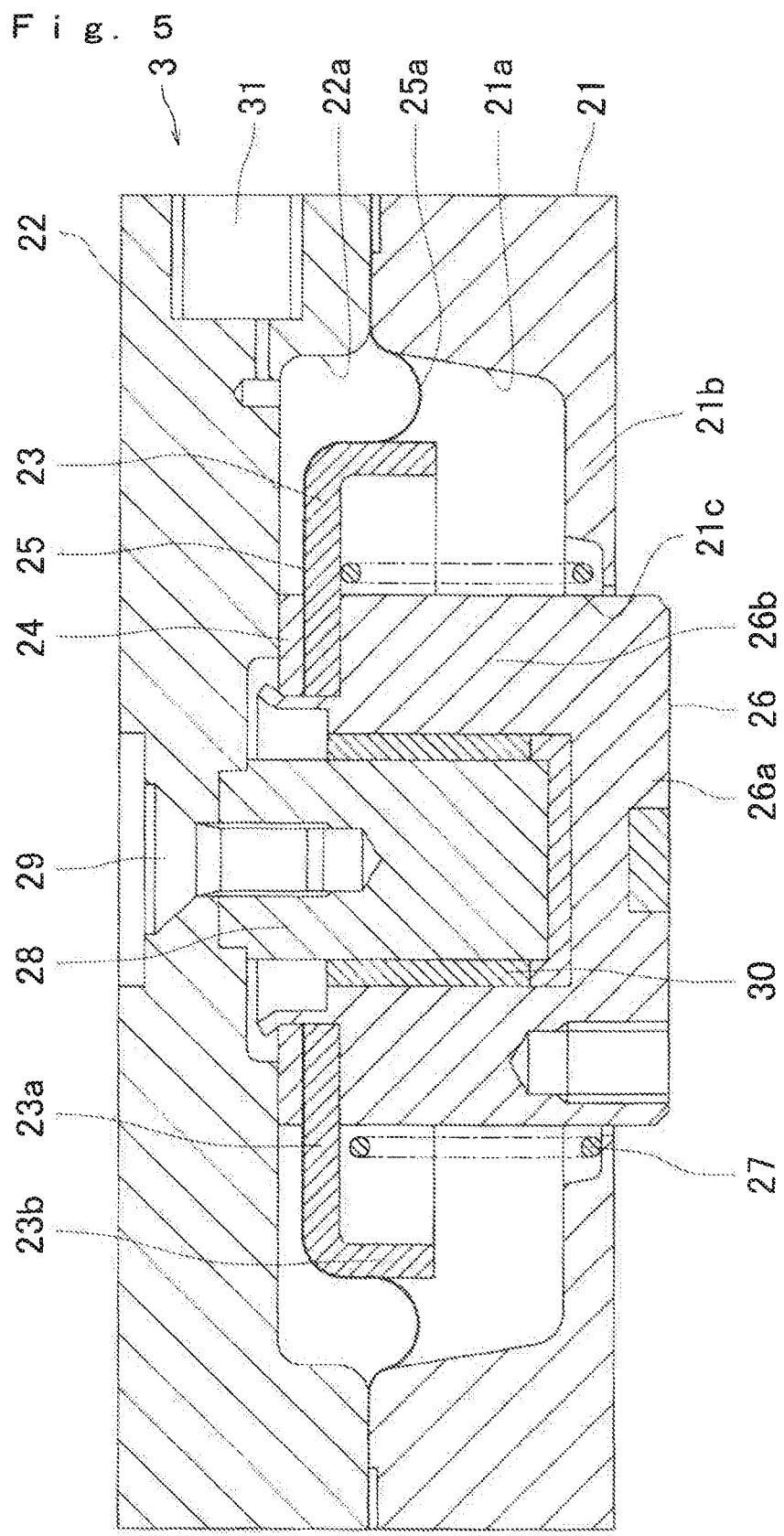
FIG. 5 is a longitudinal sectional view showing a drive device in detail.

The drive device 3 is a pneumatic cylinder device, and as shown in FIG. 5, includes: a cylinder 21 having a recess 21a that is open upward; a bonnet 22 having a recess 22a that is open downward so as to be opposed to the recess 21a of the cylinder 21, and butting against the cylinder 21 to be fixed by means of a bolt (not shown); a piston 23 disposed inside both of the recess 21a of the cylinder 21 and the recess 22a of the bonnet 22 in a vertically movable manner; and a diaphragm 25 having an edge portion (inner peripheral edge portion) of a central through hole thereof, which portion is fixed on an upper surface of the piston 23 by a retainer 24, and having an outer peripheral edge portion that is fixed between the bonnet 22 and the piston 23.

The piston 23 is formed of strip steel, and consists of: a top wall 23a having a through hole at a center portion thereof; and a peripheral wall 23b having a hollow cylindrical shape. On a lower surface (distal end side) of the top wall 23a of the piston 23, a rod 26 that moves integrally with the piston 23 is fixed. The rod 26 has a hollow cylindrical shape, consisting of a bottom wall 26a and a peripheral wall 26b. The rod 26 is inserted into a through hole 21c provided at a bottom wall 21b of the cylinder 21, and the bottom wall 26a has a lower portion that protrudes downward from a lower surface of the cylinder 21.

Between the bottom wall 21b of the cylinder 21 and the piston 23, a compression coil spring 27 is disposed to urge the piston 23 upward.

A guide 28 having a solid cylindrical shape and configured to guide the rod 26 is inserted into the through hole at the center of the top wall 23a of the piston 23 and the central through hole of the diaphragm 25 and is disposed so as to be located in the peripheral wall 26b of the rod 26, and the guide 28 is fixed to the bonnet 22 by means of a screw 29. Between an outer peripheral surface of the guide 28 and an inner peripheral surface of the peripheral wall 26b of the rod 26, a gap is formed. Inside the gap, a plain bearing 30 is disposed.

Between both of the fixed portions (between the inner peripheral edge portion and the outer peripheral edge portion) of the diaphragm 25, a turn portion 25a is provided. The turn portion 25a moves between an inner periphery of the cylinder 21 and an outer periphery of the piston 23, along with movement of the piston 23, whereby smooth movement of the piston 23 is enabled while the sealing performance is secured.

The bonnet 22 is provided with a compressed-air introduction passage 31. Compressed air that serves as a drive source is supplied to a space between the bonnet 22 and the diaphragm 25 via the compressed-air introduction passage 31. The compressed air presses the piston 23 via the diaphragm 25 whereby the piston 23 is moved integrally with the rod 26 that is fixed to the distal end side of the piston 23.

The power transmission device 4 has an amplifying mechanism 42 accommodated in a casing 41. The amplifying mechanism 42 includes: a working shaft 43 caused to move vertically by the drive device 3; a first roller-receiving member 44 that is cone-shaped and is integrally formed with the working shaft 43 at a lower end portion thereof; a second roller-receiving member 45 that is supported on an upper surface of the valve stem 15 and is configured to move vertically and integrally with the valve stem 15; a pair of roller supports 46 disposed between the first and second roller-receiving members 44, 45; a pair of rolling rollers 47 that are rollably supported on the roller supports 46 and are in contact with a tapered surface 44a formed on the first roller-receiving member 44; and a pair of pressing rollers 48 that are rollably supported on the roller supports 46 and are in contact with a horizontal roller receiving surface 45a of the second roller-receiving member 45.

Each of the roller supports 46 is configured to swing about an eccentric shaft 49 supported on the casing 41 such that the eccentric shaft 49 has an axis that is deviated from an axis of the pressing roller 48 toward an axis of the first roller-receiving member 44.

In this power transmission device 4, when a force acting on the working shaft 43 is F, and the half angle of the tapered surface 44a of the first roller-receiving member 44 is a, a force is exerted on the rolling roller 47 in the right angle direction with respect to the tapered surface 44, and a force G exerted on either one of the front or rear rolling rollers 47 is expressed as $G = F \div 2 \sin \alpha$.

The force G exerted on the rolling roller 47 is transmitted to the second roller-receiving member 45 via the roller support 46 and the pressing roller 48.

When a distance between an axis of the eccentric shaft 49 and an axis of the rolling roller 47 is C, an angle formed by: a line that connects the axis of the rolling roller 47 and the axis of the eccentric shaft 49; and the tapered surface 44a of the first roller-receiving member 44 is $\gamma$, a horizontal distance between the axis of the pressing roller 48 and the axis of the eccentric shaft 49 is $\delta$, and a downward force with which either one of the right and left pressing rollers 48 presses the corresponding second roller-receiving member 45 is N, N×δ=G×Cos γ×C is satisfied. Therefore, a downward force with which both of the right and left pressing rollers 48 presses the second roller-receiving member 45, that is, a downward force pressing the valve stem 15 is 2N=F×Cos γ×C÷Sin α÷δ. By providing α, γ, δ, and C with appropriate values, a force acting on the working shaft 43 with an arbitrary amplifying factor (Cos γ×C÷Sin α÷δ) can be amplified and transmitted to the valve stem 15.

For example, when α=40°, γ=25°, C=12.5, and δ=1.5, the amplifying factor is about 12 times, which means the diaphragm 14 can be pressed with a large force of the order of about 12 times. For instance, when the pressure is of the order of 20 MPa, a force of 300 kgf is required, but the flow rate can be controlled with one-twelfth of the force. Therefore, even when a high-pressure fluid is used, the controller 1 prevents the situation that the diaphragm 14 is lifted by the fluid and that the fluid with an amount exceeding a predetermined value flows in and flows out.

In the above description, out of FIG. 1 and FIG. 2, FIG. 1 shows an open state where the amount of downward protrusion of the rod 26 from the lower surface of the cylinder 21 is relatively small, and along with this, because the working shaft 43 is located at an upper position, the upper end portions of the roller supports come closer to each other, and the second roller-receiving member 45 is located at an upper position. FIG. shows a closed state where the amount of downward protrusion of the rod 26 from the lower surface of the cylinder 21 is relatively large, and along with this, because the working shaft 43 is located at a lower position, the upper end portions of the roller supports are farther away from each other, and the second roller-receiving member 45 is located at a lower position. A comparison between FIG. 1 and FIG. 2 as described above reveals that the amounts of the strokes (movements) of the valve stem 15 and the disc 20 may be made minute as compared to the large stroke of the working shaft 43.

Figure 3:
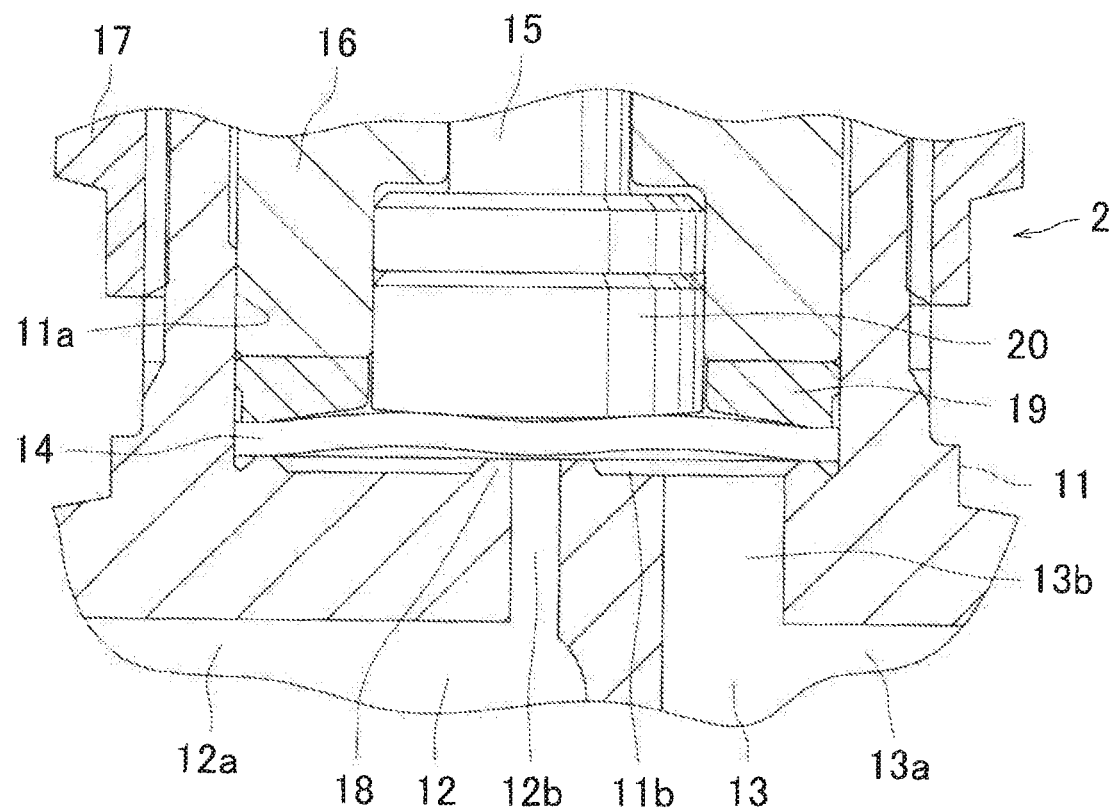
FIG. 3 shows principal components of FIG. 1 in an enlarged manner.
Figure 4:
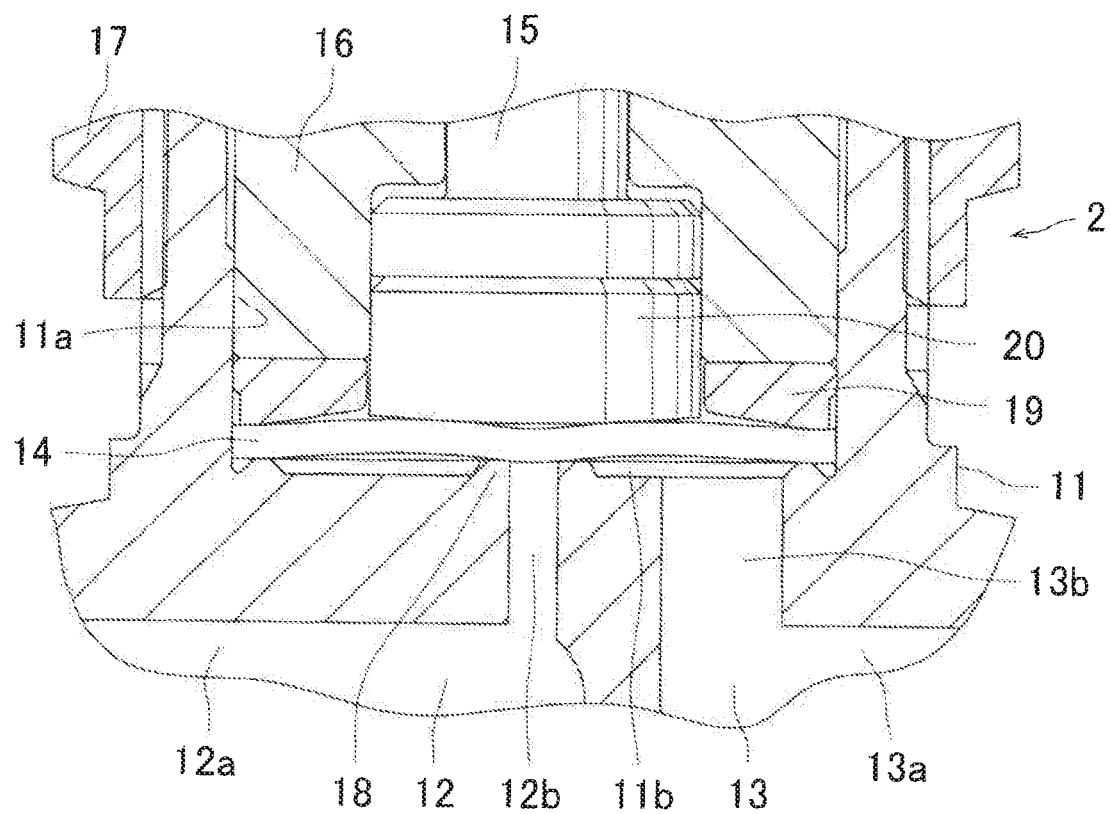
FIG. 4 shows the principal components of FIG. 2 in an enlarged manner.

FIG. 3 and FIG. 4 show principal components of FIG. 1 and FIG. 2 in an enlarged manner, with FIG. 3 showing an open state which is corresponding to FIG. 1 whereas FIG. 4 showing a closed state which is corresponding to FIG. 2. In FIG. 1 and FIG. 2, although the vertical movement of the rod 26 of the drive device 3 and the change in the state of the power transmission device 4 are clearly shown, it is difficult to tell the difference between the open and closed states. However, in FIG. 3 and FIG. 4 which are enlarged indications, it is possible to see the change between: a state shown in FIG. 3 where the valve stem 15 and the disc 20 are relatively at an upper position and the diaphragm 14 deforms so as to open the opening of the central passage 12b of the first fluid passage 12; and a state shown in FIG. 4 where the valve stem 15 and the disc 20 are relatively at a lower position and the diaphragm 14 deforms so as to close the opening of the central passage 12b of the first fluid passage 12.

In the open state, a fluid flows through the large-diameter passage 13a of the second fluid passage 13, the outside passage 13b of the second fluid passage 13, and the annular passage 11b on the outer periphery of the valve seat 18, flows into a space between the diaphragm 14 and the bottom surface of the recess 11a of the valve body 11, and then flows through the central passage 12b of the first fluid passage 12 and the large-diameter passage 12a of the first fluid passage 12 to flow out to the outside. The flow rate of the fluid is fed back via an electropneumatic regulator (not shown) to be controlled as follows: when the flow rate increases, the valve stem 15 and the disc 20 move downward that is a direction to decrease the flow rate; and when the flow rate decreases, the valve stem 15 and the disc 20 move upward that is a direction to increase the flow rate. This allows an appropriate flow rate to be maintained.

Here, it should be noted that in the conventional controller, the first fluid passage 12 is used as an inlet passage and the second fluid passage 13 is used as an outlet passage, whereas in the controller 1 described above, the second fluid passage 13 is used as an inlet passage and the first fluid passage 12 is used as an outlet passage. Due to these configurations, the conventional controller becomes unable to adjust the flow rate to a predetermined value, because when a high pressure is applied to the center portion (small area portion) of the diaphragm 14, to which the opening of the central passage 12b of the first fluid passage 12 is opposed, to cause an open state, a high-pressure fluid flows rapidly into an outer periphery portion (large area portion) of the diaphragm 14, to which an opening of the outside passage 13b of the second fluid passage 13 is opposed via the annular passage 11b, to cause the fluid passage to be open abruptly; whereas with the controller described above, because the outer periphery portion (large area portion) of the diaphragm 14 normally receives pressure to adjust the flow rate, even when a high-pressure fluid is used, the controller 1 prevents the situation in which the fluid passage is caused to be open abruptly and the fluid rapidly flows in whereby the controller 1 fails to adjust the flow rate at a predetermined value, from arising.

When the pressure of the fluid is high, a small amount of vertical movement of the valve stem 15 and the disc 20 changes the flow rate greatly. However, with the controller 1 described above, the amplifying mechanism 42 provided in the power transmission device 4 causes the valve stem 15 to move against high pressure with a large force set according to an amplifying factor thereby pressing the diaphragm 14 downward, and causes the amount of vertical movement of the valve stem 15 and the disc 20 to decrease to 1/amplifying factor of the vertical movement amount of the rod 26 of the drive device 3, whereby control with higher precision becomes possible.

Thus, by using the power transmission device 4 of an amplification type and the drive device 3 which is a pneumatic cylinder device, it becomes possible to control the flow rate of the high-pressure fluid with higher precision, and to reduce the size of the controller.

INDUSTRIAL APPLICABILITY

In accordance with the present invention, it is possible to obtain a controller which is suitable for using a high-pressure fluid and which is configured to control the flow rate of such a fluid, and the present invention thus contributes to precision improvement in the field of manufacturing using the high-pressure fluid.

The invention claimed is:
1. A controller comprising: a valve body in which a fluid passage is provided; a diaphragm configured to close and open the fluid passage by coming into contact with and separating from an annular valve seat provided to the valve body, respectively; a valve stem configured to change a position thereof, thereby deforming the diaphragm in closing and opening directions; and a drive device configured to move the position of the valve stem;
  wherein, between a working shaft of the drive device and the valve stem, a power transmission device configured to amplify a force acting on the working shaft and to transmit a resultant force thus amplified to the valve stem is provided, the diaphragm is made of metal and is deformable to either state among:
- a fully closed state in which the fluid passage is fully closed;
- a fully open state in which the fluid passage is fully open; and
- a partially open state in which the fluid passage is partially open, wherein the drive device is a pneumatic cylinder device and comprises:
- a cylinder having a recess that is open at one end side of the cylinder;
- a bonnet configured to close an opening of the cylinder;
- a piston disposed in the recess of the cylinder;
- a rod fixed to a distal end side of the piston and configured to press the working shaft; and
- a diaphragm having a center portion fixed to the piston, a peripheral edge portion fixed between the cylinder and the bonnet, and a turn portion between the center portion and the peripheral edge portion both of which are fixed,
- in which compressed air supplied between the bonnet and the diaphragm is caused to press the piston via the diaphragm, thereby moving the rod, and,
- in the partially open state, on a basis of a flow rate of a fluid that flows through the fluid passage, the drive device makes an adjustment to a position of the working shaft such that the flow rate is constant by adjusting the compressed air supplied between the bonnet and the diaphragm.

2. The controller according to claim 1, wherein the fluid passage has: a central passage that has an opening surrounded by the valve seat and that is opposed to a center portion of the diaphragm; and an outside passage that has an opening on a radially outside of the valve seat and that is opposed to a vicinity of an outer peripheral edge portion of the diaphragm, and the outside passage constitutes an inlet passage of the fluid and the central passage constitutes an outlet passage of the fluid.

3. The controller according to claim 2, wherein the central passage has a diameter that is not greater than a diameter of the outside passage.

4. The controller according to claim 1, wherein the pneumatic cylinder device is controlled by an electropneumatic regulator that controls air pressure steplessly in proportion to an electric signal.

* * * * *